Figure 1:
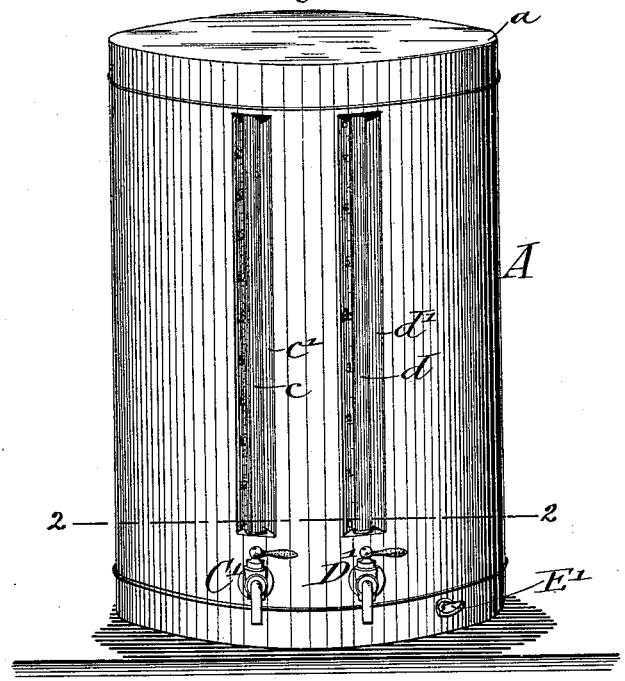

No. 653,030. Patented July 3, 1900.
P. MÜLLECKER.
MEASURING TANK.
(Application filed Mar. 2, 1900.)

(No Model.)

WITNESSES:
M. H. Wurtzel
G. C. Geibel

INVENTOR
Peter Müllecker
BY
Frank Ruegner
ATTORNEYS

THE NORRIS PETERS CO., PHOTO-LITHO., WASHINGTON, D. C.

United States Patent Office.

PETER MÜLLECKER, OF NEW YORK, N. Y.

MEASURING-TANK.

SPECIFICATION forming part of Letters Patent No. 653,030, dated July 3, 1900.

Application filed March 2, 1900. Serial No. 7,064. (No model.)

*To all whom it may concern:*

Be it known that I, PETER MÜLLECKER, a citizen of the United States, residing in the city of New York, borough of Brooklyn, and State of New York, have invented certain new and useful Improvements in Measuring-Tanks, of which the following is a specification.

This invention relates to tanks for storing kerosene, petroleum, or other oils or liquids of any kind and from which the liquid may be drawn off as required.

The object of the invention is to provide means connected with such a tank whereby the amount of liquid contained in the tank can be conveniently observed and the amount drawn accurately measured off. When a common tank of large area is employed, the drawing therefrom of a small quantity—such, for example, as a quart—lowers the level of the liquid so slightly that even were a gage-glass and scale arranged outside the tank it would be extremely difficult to measure off, by the fall of the liquid, the exact quantity desired.

To overcome this objection, my invention consists of a measuring-tank comprising a tank provided with vertical depressions, a partition-wall in said tank dividing the same into two compartments having bottoms at the same level, discharge-cocks for said compartments respectively below said depressions, graduated gage-glasses, one for each compartment, arranged in said depressions, and a cock located below the level of the discharge-cocks for permitting and shutting off a flow of liquid from one compartment to the other.

Figure 2:
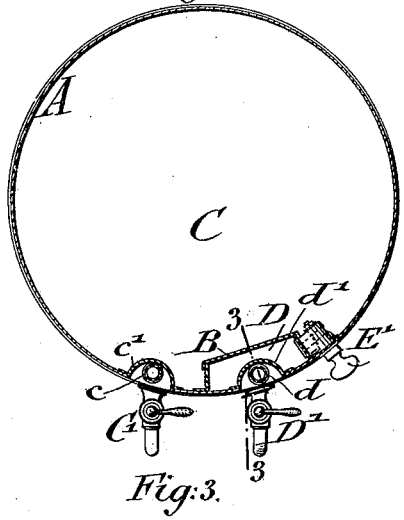
Figure 3:
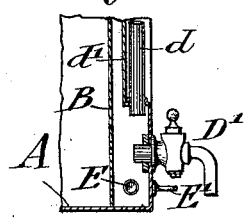

In the accompanying drawings, Figure 1 represents a front elevation of my improved measuring-tank. Fig. 2 is a horizontal section on line 2 2, Fig. 1; and Fig. 3 is a vertical section through a portion of the tank on line 3 3, Fig. 2.

Similar letters of reference indicate corresponding parts.

Referring to the drawings, A represents a tank, which may be of any suitable shape and which is preferably provided with a removable cover $a$. At the interior of the tank is arranged a partition-wall B, which extends to the bottom of the same and divides the tank thereby into two compartments C and D, one of which has preferably several times the area of the other. The bottom of the tank forms thereby the bottoms of the compartments, which are thereby at approximately the same level. Cocks $C'$ and $D'$ are arranged at the lower part of the tank for drawing off the contents of the same respectively from the compartments C and D, and in connection with each compartment is arranged a gage-glass and scale for indicating the level and quantity of the liquid contained in the compartment and the quantity drawn therefrom. These gage-glasses $c$ and $d$ are preferably located in vertical grooves or depressions $c'$ $d'$ of the tank-wall, so as to be protected from breakage, each depression preferably being arranged above the cocks $C'$ and $D'$, respectively, and each gage-glass passing directly through the tank-wall at the bottom of the depression into the compartment opposite the same, as shown in Fig. 3, or being otherwise connected with said compartment. The depressions terminate below the cover and the gage-glasses enter the tank at their upper ends at the termination of the depressions. The graduations for each gage-glass may be arranged upon the tank-wall in the depression in which the gage-glass is located. At its lower portion, below the level of the cocks $C'$ $D'$, the partition-wall B is provided with a tube E for permitting the passage of the liquid from one compartment into the other, and in said tube is arranged a cock $E'$, the stem of which extends through the tank-wall to the outside of the same, so that by turning the cock $E'$ a flow of liquid between the tanks may be permitted or shut off, as desired.

When the tank is to be used, the same may be filled by removing the cover $a$, opening the cock $E'$, and supplying the liquid to the larger compartment, from which it flows into the smaller compartment until both are filled. The cock $E'$ is then closed and the receiving vessel held below the discharge-cock $C'$ or $D'$, according as a large or small quantity of liquid is to be drawn. The cock is then opened and the quantity drawn is indicated by the fall of the liquid in the gage-glass of the compartment from which the liquid is taken. When the required quantity is drawn or the compartment emptied, the discharge-cock is closed. The cock $E'$ may then be opened, so that the liquid can level itself in the two compartments, or the flow may be shut off at any desired point. Each compartment thus acts as a storage-compartment for the other in addition to its function as a supply-compartment from which the liquid can be drawn directly in measured quantities.

The gage-glass of the smaller compartment D is preferably graduated for quarts and fractions of the same, and the glass of the larger compartment for gallons. The quarts-compartment is preferably made of comparatively-small area, whereby the graduations on the glass are well spaced apart, so that the quantity required can be very accurately drawn off. Every fourth quart graduation may be marked in red or otherwise distinguished, so as to indicate gallons on the quart-scale and on the gallon-scale every fifth gallon graduation may be so marked, so as to indicate every fifth gallon drawn. The graduations are preferably numbered from the bottom upwardly, so as to indicate at any time the quantity remaining in the compartment.

Having thus described my invention, I claim as new and desire to secure by Letters Patent—

A measuring-tank, comprising a tank provided with vertical depressions, a partition-wall in said tank dividing the same into two compartments having bottoms at the same level, discharge-cocks for said compartments arranged at a level with each other respectively below said depressions, graduated gage-glasses, one for each compartment, arranged at a level with each other, in said depressions, and a cock located below the level of the discharge-cocks for permitting and shutting off a flow of liquid from one compartment to the other, substantially as set forth.

In testimony that I claim the foregoing as my invention I have signed my name in presence of two subscribing witnesses.

PETER MÜLLECKER.

Witnesses:
PAUL GOEPEL,
JOSEPH H. NILES.